3,404,119
POLYAMIDES CONTAINING A PIGMENT AND A BASIC PRODUCT OBTAINED FROM A CONDENSATE OF NAPHTHALENE SULPHONIC ACID AND FORMALDEHYDE
Harold Roy Harper and Leslie Arthur Mather, Manchester, England, assignors to Imperial Chemical Industries Limited, London, England, a corporation of Great Britain
No Drawing. Filed Jan. 17, 1966, Ser. No. 520,862
Claims priority, application Great Britain, Feb. 22, 1965, 7,603/65
2 Claims. (Cl. 260—37)

ABSTRACT OF THE DISCLOSURE

A pigmented synthetic linear polyamide composition which comprises a synthetic linear polyamide, an organic pigment in finely divided form which is stable to the action of molten synthetic linear polyamide and a dispersing agent selected from basic products which are condensates of naphthalene sulphonic acid and formaldehyde.

This invention relates to pigmented synthetic linear polyamides and to their manufacture.

One convenient process by which shaped articles composed of synthetic linear polyamides are coloured is that known as mass pigmentation, according to which a colouring material which is insoluble in the molten polymer is incorporated in the polymer mass before it is formed into the shaped article. In this process it is essential that the pigment should be finely divided in order to obtain good tinctorial yield, and, in the case where the shaped article is formed by an extrusion process, in order to obviate fouling of the extrusion assembly and weakness in the extruded articles. Since the shaping process is normally carried out with molten polymer, the pigment is also desirably stable to the action of the molten polymer.

A number of different methods have been proposed for achieving a fine state of division in the polymer mass. According to one process a fine aqueous dispersion of the pigment is first prepared by milling the pigment with water and a suitable dispersing agent. This aqueous dispersion is then added to the polyamide forming composition during the condensation stage of the polyamide forming reaction and the water in the aqueous dispersion is removed together with any water present in the polyamide forming composition and that formed in the condensation reaction to give molten polyamide containing the pigment which is subsequently formed into the shaped article either directly or after solidification and remelting. The dispersing agents used hitherto in this process are effective in producing and maintaining a fine stage of division of the pigment in the aqueous medium, but once the water is removed these dispersing agents are believed to make little contribution to the maintenance of the fine state of division of the pigment in the molten polymer.

According to another process the synthetic linear polyamide in the form of small pieces known as "chip" is thoroughly mixed with finely ground pigment so as to coat the chip with pigment, and the chip is then melted and the polyamide formed into the shaped article. By this method, however, the pigment in the molten polymer, no matter how finely ground initially, contains aggregate particles which cause difficulty during the shaping process, for example by blocking filters or fouling the extrusion assembly. In order to obviate this difficulty it has been proposed to coat the chip with a composition containing finely divided pigment and finely divided synthetic linear polyamide which may be applied to the chip in the form of an aqueous paste, the coated chip being then melted and formed into the shaped article in the usual way. Such compositions may be obtained for example by milling together pigment, water and finely divided synthetic linear polyamide. The finely divided synthetic linear polyamide may be obtained by dissolving the polyamide in a suitable solvent, especially formic acid, and diluting the solution with a nonsolvent for the polyamide, for example water or aqueous formic acid, in order to precipitate the polyamide in finely divided form which may then be filtered off, washed with water and used as an aqueous paste or dried prior to use. A dispersing agent may be added during the aqueous milling of the pigment with the finely divided synthetic linear polyamide but those which have been used hitherto in this process are believed to make little contribution to the dispersion of the pigment in the polyamide.

We have now found that certain basic products and their salts are particularly valuable when used as dispersing agents in pigmented synthetic linear polyamide compositions useful for forming into coloured polyamide shaped articles.

The basic products are obtained from an already known valuable class of anionic dispersing agents which are the salts of the condensates obtained by reacting a naphthalene sulphonic acid with formaldehyde. The basic products are obtained from the aforesaid condensates by converting the sulphonic acid groups into sulphon halide groups and reacting the latter with diamines one amine group of which is a primary or secondary amino group and the other is a tertiary amino group and is attached to a saturated carbon atom.

Thus the basic products may be defined as condensates of naphthalene sulphonic acid and formaldehyde in which the sulphonic acid groups are converted into substituted sulphamyl groups of the formula

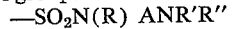

in which A represents a bivalent organic radical attached through carbon atoms thereof to the nitrogen atoms, the carbon atom to which the group —NR′R″ is attached being a saturated carbon atom, R represents a hydrogen atom or an aliphatic, cycloaliphatic, araliphatic or aromatic radical and R′ and R″, which may be the same or different, represent aliphatic, cycloaliphatic or araliphatic radicals, and in which the radicals R and R′ or R′ and R″ may be joined, or the salts of such basic products.

The basic products may be obtained by converting the sulphonic acid groups in a condensate of naphthalene sulphonic acid and formaldehyde into sulphon halide groups and then reacting the product with a diamine of the formula NHR.A.NR′R″ in which A, R, R′ and R″ have the same significance as before to give substituted sulphamyl groups of which the N-substituent is the residue of the said diamine.

As examples of the aliphatic radicals which R, R′ and R″ may represent there may be mentioned in particular alkyl and substituted alkyl groups especially unsubstituted lower alkyl groups having from 1 to 6 carbon atoms and said lower alkyl groups substituted by hydroxy or alkoxy groups. As specific examples of such groups there may be mentioned methyl, ethyl, propyl, butyl, hydroxyethyl or methoxyethyl groups. As examples of the cycloaliphatic radicals which R, R′ and R″ may represent there may be mentioned cyclopentyl, cyclohexyl and alkyl substituted cyclopentyl and cyclohexyl radicals. As examples of araliphatic radicals which R, R′ and R″ may represent there may be mentioned benzyl and phenylethyl radicals. As examples of the aromatic radicals which R may represent there may be mentioned phenyl, tolyl and chlorophenyl radicals.

The radical A may be any bivalent organic radical provided the valencies are attached to carbon atoms and one of these carbon atoms is a saturated carbon atom. Particularly suitable are bivalent aliphatic radicals and especially alkylene radicals of the formula $-C_nH_{2n}-$, $n$ being an integer greater than one, especially an integer from 2 to 6, for example, ethylene, propylene, butylene and hexamethylene radicals.

The napathalene sulphonic acid use in the manufacture of the basic products may be any naphthalene sulphonic acid but is preferably napththalene monosulphonic acid or a mixture of napthalene monosulphonic acid with minor amounts of naphthalene polysulphonic acid. The naphthalene monosulphonic acid may be the α- or β-sulphonic acid but is preferably the β-sulphonic acid which may contain minor amounts of the α-sulphonic acid. Such sulphonic acids and mixtures of sulphonic acids are obtained by the sulphonation of naphthalene.

The condensation of naphthalene sulphonic acid and formaldehyde is carried out in known manner. Preferably the molar ratio of formaldehyde to naphthalene sulphonic acids lies within the range 0.5 to 1.0.

The condensates of naphthalene sulphonic acid and formaldehyde are mixtures of polymeric compounds of uncertain constitution. The condensates of naphthalene monosulphonic acid and formaldehyde may probably be conveniently represented by the formula:

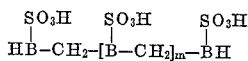

in which B represents a bivalent napththalene radical and $m$ represents zero or a positive integer. The normal range for $m$ is believed to lie between 0 and 8.

In order to manufacture the basic products the sulphonic acid groups the naphthalene sulphonic acid/formaldehyde condensates are first converted to sulphon halide groups. By sulphon halide groups we mean sulphon chloride or sulphon bromide groups. Conversion to sulphon halide groups is effected in known manner. For example, the naphthalene sulphonic acid/formaldehyde condensate as its sodium salt is heated with phosphorus pentachloride optionally in admixture with phosphorsu oxycloride, and the sulphon chloride isolated by pouring the mixture into ice and water and filtering off the product. Alternatively conversion to the sulphon halide may be effected by heating with thionyl chloride or thionyl bromide for example in dimethyl formamide. It is the aim to convert all, or substantially all, of the sulphonic acid groups in the naphthalene sulphonic acid/formaldehyde condensate into sulphon halide groups.

The condensates containing sulphon halide groups are then reacte with a diamine of the formula

As examples of suitable diamines there may be mentioned N,N-dimethylethylenediamine, 3-dimethylaminopropylamine, 3-di-n-butylaminopropylamine and N,N-dimethyl-N'-phenylethylene-diamine. As an example of a suitable dimaine in which the radicals R and R' are joined there may be mentioned N-methylpiperazine. As examples of a suitable diamine in which the radicals R' and R'' are joined there may be mentioned 3-hexamethyleneiminopropylamine and N-β-aminoethylpiperdine. The reaction may be carried out by mixing the sulphon halide and the diamine, optionally in the presence of water or an organic solvent, and heating until the reaction is complete. Preferably a stoichiometric excess of the diamine is used. Depending on the particular diamine used and on whether the sulphon halide is a sulphon chloride or a sulphon bromide suitable conditions of heating may vary, for example for from 30 minutes to 16 hours at temperatures of from 0° to 100° C. The product of the reaction is a basic product or a hydrochloric or hydrobromic acid salt thereof or a mixture of the base and salt.

The basic products are soluble in dilute aqueous acids to give aqueous solutions of salts of the invention. Those basic products of the invention in which R represents hydrogen are also soluble in dilute aqueous alkalis.

The basic products may also be made by variants of the manufacturing process already described. For example, the sulphonic acid groups in the naphthalene sulphonic acid/formaldehyde condensate may be converted into sulphamyl ($SO_2NH_2$) groups by first converting to sulphon halide groups and then reacting the latter with ammonia. The sulphamyl groups are then reacted in the presence of alkali with a compound of the formula X.A.N.R'R'' in which X represents a halogen atom and A, R' and R'' have the same significance as before to give a basic product in which R represents a hydrogen atom.

Thus the invention is a pigmented synthetic linear polyamide composition which comprises a synthetic linear polyamide, an organic pigment in finely divided form which is stable to the action of molten synthetic linear polyamide, and a basic product or a salt thereof as hereinbefore defined.

The compositions of our invention may be obtained in molten form, in massive solid form, for example as lumps or chips, in powder form or in the form of pastes with liquids especially water.

By synthetic linear polyamides we mean linear polymers having recurring amide linkages in the main polymer chain. Such polymers are obtained, for example, by the polycondensation of amino acids or by the polycondensation of diamines with dicarboxylic acids. In particular we mean those polymers known generically as nylons, of which polyhexamethyleneadipamide and polycaprolactam are familiar examples.

Organic pigments which are insoluble in and stable to the action of molten syntheic linear polyamides and may therefore be contained in our pigmented polyamide compositions include pigments of the phthalocyanine series, for example copper and nickel phthalocyanines and their halogenation products, copper tetra and octa-phenylphthalocyanine and copper tetra-tolylmercaptophthalocyanine. Further examples of such pigments are the bis-methyl-imide and bis-(3,5-dimethylphenyl)imide of perylene-3,4,9,10-tetracarboxylic acid and the bis-iminazole from the said acid and o-phenylenediamine. We also include carbon black as an example of an organic pigment which may be a constituent of our pigmented polyamide compositions.

The organic pigment in the compositions of our invention is in finely divided form. One method of preparing the compositions of our invention is to first prepare a fine aqueous dispersion of the pigment by milling together the pigment, water and the basic product or a salt thereof. The milling may be carried out by any of the well known techniques, for example by vigorous agitation with hard glass spheres or sand, or by gravel or ball-milling. It is a particular advantage that the basic products in the form of their water-soluble salts, such as the acetates, are very suitable dispersing agents for producing aqueous dispersions of the pigments. The aqueous dispersion is then added to the synthetic linear polyamide forming composition during the condensation stage of the polyamide forming reaction, and the reaction is then completed during which the water present in the aqueous dispersion, any water present in the polyamide forming composition and the water formed in the condensation reaction is removed by distillation to give a composition of our invention in molten form, namely molten synthetic linear polyamide containing finely divided pigment and the basic product. The molten composition may then, for example, be extruded in the form of a ribbon which then solidifies and may be cut into chips. The solid pigmented polyamide composition may then be remelted and formed into a coloured shaped article by casting or extrusion techniques, for example it may be spun into coloured filaments in a melt-spinning apparatus.

In this process the ratio of the basic product to the pigment may be varied widely but is normally within the range 1 to 20% by weight. The aqueous dispersion of the pigment may be added to the synthetic linear polyamide forming composition at any stage of the condensation reaction. It may for example be added to the composition before the condensation reaction is started by heating, or it may be added during the early stages of the condensation before any substantial amount of water has been distilled out of the composition. Alternatively it may be added during a later stage of the condensation. The relative proportions of the pigment to synthetic linear polyamide in this process will vary of course depending on the amount of pigment desired in the final product, and is not critical, but normally the ratio of pigment to synthetic linear polyamide lies within the range 0.1 to 5% by weight.

Another method of preparing the compositions of our invention is to first prepare a dispersion of the pigment in a water-miscible liquid aliphatic acid by milling together the pigment, the said aliphatic acid and the basic product or a salt thereof. Normally the basic product will be present in the dispersion in the form of its salt with the aliphatic acid. The dispersion is then mixed with a solution of the synthetic linear polyamide in a water-miscible liquid aliphatic acid, and the resulting dispersion is diluted with a liquid non-solvent for the polyamide. When the non-solvent has been added in sufficient quantity to cause precipitation of the synthetic linear polyamide the pigment is found to be present in the precipitate and the solvent phase to be free of dispersed pigment. The basic product is usually found to be partitioned between the solid and liquid phases, the more substantial proportion being present in the solid phase. The precipitate therefore comprises polyamide, pigment and basic product and is a pigmented synthetic linear polyamide composition of our invention.

The precipitated composition may be separated from the liquid by filtration or other means and may be washed with water, may be dried if desired to produce a powder or may be mixed with water to form a pourable suspension. The powder or the aqueous suspension can then be used to coat synthetic linear polyamide chip and the coated chip melted and formed into coloured shaped articles.

In this process the water-miscible liquid aliphatic acid is preferably formic acid of 85% to 100% strength by weight. The liquid non-solvent for the polyamide may be, for example, water, acetone or alcohol, but in the case where the solvent used is formic acid the non-solvent is preferably dilute aqueous formic acid of strength not greater than 50% by weight. Since the product of the process is normally used for coating polymer chip the relative proportions of pigment to synthetic linear polyamide may normally be higher than in the first described process in order that there may be sufficient pigment in the final coloured shaped article, and the ratio of pigment to synthetic linear polyamide normally falls within the range 20% to 200% by weight. The ratio of basic product to pigment in the process normally falls within the range 1% to 20% by weight.

The pigmented synthetic linear polyamide compositions of our invention contain the pigment in a very finely divided state and in this respect are superior to compositions prepared by similar techniques with dispersing agents employed hitherto such as the sodium salt of the condensation product of naphthalene sulphonic acid and formaldehyde. They are suitable for forming into shaped articles by melting followed by casting or extrusion and give coloured shaped articles containing pigment in a very finely divided state which are superior in this respect to coloured shaped articles prepared from pigmented synthetic linear polyamide compositions known hitherto.

The invention is illustrated but not limited by the following examples in which the parts and percentages are by weight:

Example 1

A mixture of 20 parts of the sodium salt of the condensation product of naphthalene β-sulphonic acid and formaldehyde, 40 parts of phosphorus pentachloride and 42 parts of phosphorus oxychloride is stirred and boiled under reflux for 2 hours. After cooling and adding to excess ice and water, the acid chloride is filtered off, washed with water and dried under reduced pressure at 20° C.

40.5 parts of 3-dimethylaminopropylamine are stirred whilst 20 parts of the acid chloride are gradually added with cooling. The mixture is stirred for 2 hours at 90–100° C., cooled, diluted with water, acidified with acetic acid and then basified with ammonia. The basic sulphonamide if filtered off, washed and dried. It is soluble in dilute acids and in sodium hydroxide solution.

Example 2

A mixture of 1880 parts of N,N-dimethylformamide and 750 parts of the sodium salt of the condensation product of naphthalene β-sulphonic acid and formaldehyde is stirred whilst 1040 parts of thionyl chloride are gradually added, keeping the temperature below 50° C. After stirring for ½ hour at 50° C. and cooling, the mixture is added to a mixture of 1500 parts of water and 1500 parts of ice. The acid chloride is filtered off and well washed with water. The filter cake is slurried with water and stirred below 10° C. whilst a mixture of 445 parts of 3-dimethylaminopropylamine and 550 parts of water is added. After stirring for 1 hour below 10° C., and then for 2 hours at 70° C. the aqueous layer is decanted from the heavy gum, which is washed by decantation with hot water and dried. The product has similar properties to that of Example 1.

Example 3

A suspension, containing 30 parts of carbon black in a solution of 3 parts of the condensation product of 3-dimethylaminopropylamine with the sulphon chloride of a naphthalene-2-sulphonic acid/formaldehyde condensate (prepared as described in Example 2) in 167 parts of 1.33% aqueous acetic acid, is milled by vigorous agitation with hard glass spheres. 180 parts of the milled dispersion are introduced into an autoclave containing 1740 parts of the salt formed from hexamethylene diamine and adipic acid (6:6-nylon salt) and 746 parts of water during the early stages of polycondensation and the polymerisation is completed. The polymer is extruded as a ribbon which is cut into chips and spun into yarn from a melt-spinning apparatus. Both the extruded polymer and the spun yarn contain the pigment in an extremely fine state of dispersion.

Example 4

10 parts of copper phthalocyanine (C.I. Pigment Blue 15) are finely dispersed by milling in 71 parts of 85% formic acid containing 1 part of the condensation product of dimethylaminopropylamine with the sulphon chloride from naphthalene-2-sulphonic acid/formaldehyle condensation (prepared as described in Example 2). The dispersion is mixed with a solution of 50 parts of polyhexamethylene adipamide in 266 parts of 85% formic acid and the mixture is stirred and diluted with 320 parts of 45% formic acid. The precipitate is filtered and washed with water until free of acid. The strength of the resulting filter cake is determined by drying down a portion and the remainder is diluted with water to give a pourable dispersion containing 3% of pigment.

The composition so obtained is tumbled with polyhexamethylene adipamide chips under conditions where all the water is driven off and the chips are thereby coated with pigment. When these coated chips are melted and spun in conventional manner blue filament is obtained containing the pigment dispersed finely and uniformly throughout.

What we claim is:

1. A pigmented synthetic linear polyamide composition consisting essentially of a synthetic linear polyamide, an organic pigment in finely divided form which is stable to the action of molten synthetic linear polyamide in amounts of 0.1 to 200% by weight of said polyamide and a dispersing agent in amounts of 1–20% by weight of said pigment, said dispersing agent being selected from basic products which are condensates of 1 mole of naphthalene sulphonic acid and from 0.5 to 1 mole of formaldehyde in which the sulphonic acid groups are converted into substituted sulphamyl groups of which the N-substituent is the residue of a diamine of the formula NHRANR′R″ wherein A represents an alkylene radical having from 2 to 6 carbon atoms, R represents a member selected from the group consisting of hydrogen, alkyl having 1–6 carbon atoms, hydroxyl alkyl having 1–6 carbon atoms, alkoxy alkyl wherein the alkyl moiety has 1–6 carbon atoms, cyclopentyl, cyclohexyl, benzyl, phenylethyl, phenyl, tolyl and chlorophenyl radicals and R′ and R″ each represent radicals selected from the group consisting of alkyl having 1–6 carbon atoms, hydroxyl alkyl having 1–6 carbon atoms, alkoxy alkyl wherein the alkyl moiety has 1–6 carbon atoms, cyclopentyl, cyclohexyl, benzyl and phenylethyl radicals and in which radicals R and R′ and R′ and R″ may be joined and the salts of such basic products.

2. The composition of claim 1 in which the dispersing agent is a condensate of naphthalene-$\beta$-sulphonic acid and formaldehyde in which the molar ratio of naphthalene sulphonic acid to formaldehyde lies within the range 0.5 to 1.0 and in which the sulphonic acid groups are converted into substituted sulphamyl groups of which the N-substituent is the residue of a diamine of the formula NHR.A.NR′R″ in which A represents an alkylene radical having from 2 to 6 carbon atoms, R represents a hydrogen atom and R′ and R″ represent lower alkyl groups having from 1 to 6 carbon atoms.

References Cited

FOREIGN PATENTS

| | | |
|---|---|---|
| 1,171,394 | 6/1964 | Germany. |
| 820,975 | 9/1959 | Great Britain. |
| 838,668 | 6/1960 | Great Britain. |
| 839,712 | 6/1960 | Great Britain. |

MORRIS LIEBMAN, *Primary Examiner.*

B. AMERNICK, *Assistant Examiner.*